(12) United States Patent
Nishimura

(10) Patent No.: US 7,085,048 B2
(45) Date of Patent: Aug. 1, 2006

(54) REAL IMAGE TYPE VARIABLE MAGNIFICATION FINDER AND IMAGING APPARATUS USING THE SAME

(75) Inventor: Kazuya Nishimura, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/994,474

(22) Filed: Nov. 23, 2004

(65) Prior Publication Data

US 2005/0111098 A1 May 26, 2005

(30) Foreign Application Priority Data

Nov. 26, 2003 (JP) .............................. 2003-396014

(51) Int. Cl.
*G02B 15/14* (2006.01)
*G02B 13/06* (2006.01)

(52) U.S. Cl. ........................ 359/432; 359/422; 359/431

(58) Field of Classification Search ........ 359/420–422, 359/431–432, 676, 690–691; 396/373–386
See application file for complete search history.

(56) References Cited

U.S. PATENT DOCUMENTS 5,323,264 A * 6/1994 Kato .......................... 359/432
5,640,632 A * 6/1997 Koyama et al. ............. 396/382
6,282,381 B1 * 8/2001 Koyama ..................... 396/384

* cited by examiner

*Primary Examiner*—Drew A. Dunn
*Assistant Examiner*—Mark Consilvio
(74) *Attorney, Agent, or Firm*—Kenyon & Kenyon LLP (57) ABSTRACT

A real image type variable magnification finder comprises, an object optical system having positive refracting power which forms an objective image as a middle image, a view frame arranged near a position of the middle image, and an eyepiece optical system having positive refracting power which forms a pupil for observing the middle image, wherein an erect image optical surface for making the erect image by bending optical path is formed on the way of these optical paths. The object optical system comprises, in order from an object side, a negative lens element which is a single lens, a positive lens element which is a single lens, wherein both lens elements are moved by changing a distance between the negative lens element and the positive lens element when magnification is varied. The eyepiece optical system comprises a prism which has an entrance surface near the position of the middle image, and a positive lens element which is a single lens, wherein the erect image optical surface is arranged to be divided before and after the middle image position, the total number of lens elements and prism which have refracting power in the whole real image type variable magnification finder system is four, and the lens elements and the prism are composed of plastic.

25 Claims, 4 Drawing Sheets

FIG. 3A
SPHERICAL ABERRATION
PD 4mm

(m⁻¹)

FIG. 3B
ASTIGMATISM
ω 25.94

(m⁻¹)

FIG. 3C
DISTORTION
ω 25.94

(%)

FIG. 3D
SPHERICAL ABERRATION
PD 4mm

FIG. 3E
ASTIGMATISM
ω 18.10

FIG. 3F
DISTORTION
ω 18.10

FIG. 3G
SPHERICAL ABERRATION
PD 4mm

FIG. 3H
ASTIGMATISM
ω 12.98

FIG. 3I
DISTORTION
ω 12.98

REAL IMAGE TYPE VARIABLE MAGNIFICATION FINDER AND IMAGING APPARATUS USING THE SAME

The contents of application No. 2003-396014 filed on Nov. 26, 2003, in Japan, are hereby incorporated by reference.

BACKGROUND OF THE INVENTION

1. Field of the Invention

The present invention relates to a real image type variable magnification finder and an imaging apparatus using the same.

2. Description of the Related Art

Conventionally, in an imaging apparatus, especially a low price lens shutter type camera, a virtual image type finder has been used in many cases even in what using a zoom lens. However, in such a virtual image type finder, a view frame is hardly seen, and the lens itself becomes large. For this reason, even in such kind of lens shutter type camera, a real image type finder has become to be used increasingly.

SUMMARY OF THE INVENTION

The real image type variable magnification finder according to the present invention comprises, an object optical system having positive refracting power which forms an objective image as a middle image, a view frame arranged near a position of the middle image, an eyepiece optical system having positive refracting power which forms a pupil for observing the middle image, wherein an erect image optical surface for making an erect image by bending an optical path is formed on the way of optical paths of the object optical system and the eyepiece optical system. The object optical system further comprises, in order from an object side, a negative lens element which is a single lens, a positive lens element which is a single lens, wherein both of the negative lens element and the positive lens element are moved by changing a distance between the negative lens element and the positive lens element when magnification is varied, and the eyepiece optical system further comprises a prism which has an entrance surface near the position of the middle image, and a positive lens element which is a single lens, wherein the erect image optical surface is arranged to be divided before and after the middle image position, the total number of lens elements and prism which have refracting power in the whole real image type variable magnification finder system is four, and the lens elements and the prism are composed of plastic.

The real image type variable magnification finder according to the present invention comprises, an object optical system having positive refracting power which forms an objective image as a middle image, a view frame arranged near a position of the middle image, an eyepiece optical system having positive refracting power which forms a pupil for observing the middle image, wherein an erect image optical surface for making an erect image by bending an optical path is formed on the way of optical paths of the object optical system and the eyepiece optical system. The object optical system further comprises, in order from an object side, a negative lens element which is a single lens, a positive lens element which is a single lens, wherein both of the negative lens element and the positive lens element are moved by changing a distance between the negative lens element and the positive lens element when magnification is varied, and the eyepiece optical system further comprises a prism having an entrance surface near the position of the middle image, and a positive lens component, wherein the erect image optical surface is arranged to be divided before and after the middle image position, and the total number of lens component and prism which have refracting power in the whole real image type variable magnification finder system is four.

The imaging apparatus according to the present invention has the real image type variable magnification finder mentioned above.

These and other features and advantages of the present invention will become apparent from the following detailed description of the preferred embodiments when taken in conjunction with the accompanying drawings.

BRIEF DESCRIPTION OF THE DRAWINGS

FIGS. 3A to 3I are diagrams showing spherical aberration, astigmatism and distortion when focusing at infinite object point is performed in the first embodiment of the real image type variable magnification finder according to the present invention.

DETAILED DESCRIPTION OF THE PREFERRED EMBODIMENTS

Prior to explanation of embodiments, actions and effects of the present invention will be explained.

According to the present invention, a real image type variable magnification finder comprises, an object optical system having positive refracting power which forms an objective image as a middle image, a view frame arranged near the middle image position, and an eyepiece optical system having positive refracting power which forms a pupil for observing the middle image, wherein an erect image optical surface for making the erect image by bending optical path is formed on the way of these optical paths. The object optical system further comprises, in order from an object side, a negative lens element which is a single lens, a positive lens element which is a single lens, wherein both lens elements are moved by changing the distance between the negative lens element and the positive lens element when magnification is varied.

According to the present invention, by composing such that the object optical system is composed of only the least number of lenses having a variable magnification function and is made as much as possible, not to have a prism which is expensive relatively, not only cost for parts can be suppressed but also an influence by change of temperature or humidity can be reduced.

In the real image type variable magnification finder according to the present invention, the eyepiece optical system comprises a prism having an entrance surface near the middle image position and a positive lens element which is a single lens.

In such way, if a prism having an entrance surface near the middle image position is used, it becomes easy to stamp a mark such as a target mark and the like within a visual field.

If an eyepiece optical system is composed so as to have a prism, a part of an erect image action can be shared without increasing the focal length of the eyepiece optical system.

In an eyepiece optical system, if a lens arranged at utmost pupil side is composed independently, deviation of diopter on a middle image forming surface by variation in manufacture error of each plastic prism can be easily corrected at the time of assembling, and cost reduction including assembling can be attained.

In the real image type variable magnification finder according to the present invention, the total number of lenses and prism having refracting power in the whole real image type variable magnification finder system are four, and these lenses and the prism are composed of plastic. By such composition, a real image type variable magnification finder which is cheap as a whole composition, and easy to keep optical performances such as a moderate variable magnification ratio and aberration correction performance and has little diopter change can be obtained.

In the real image type variable magnification finder of the present invention, a cover member can be arranged before and after a finder. A view frame can be what is composed of a space or a transparent component in an effective area or something black painted on an entrance surface of a prism.

In the real image type variable magnification finder according to the present invention, it is desirable that a flare stop which remains fixed irrespective to a magnification state of the object optical system is arranged near a position of surface top at the pupil side of the positive lens element in a state where the positive lens element of the object optical system is at a nearest position to the middle image.

Arranging a flare stop by using painting, a shading component and the like in order to prevent degradation of the optical performance of an object optical system brings increase of a manufacturing cost as an amount of work and a component for such arrangement are additionally needed. As shown in the real image type variable magnification finder according to the present invention, by composing such that a flare stop which remains fixed is arranged near a position of surface top at the pupil side of the positive lens element in a state where the positive lens element of the object optical system is at a nearest position to the middle image, it becomes advantageous to reduction of a flare, without composing a shading means moving toward a direction of optical axis. Furthermore, the flare stop can be composed of a structural component (a component of housing portion) which composes a finder, without bringing a hindrance of lens movement. Therefore, the flare can be suppressed effectively without making cost increase. In the real image type variable magnification finder according to the present invention, it is desirable that the following condition is satisfied:

$$0.8 < |fn/fp| < 1.8 \quad (1)$$

where fn represents a focal length of the negative lens element of the object optical system, and fp represents a focal length of the positive lens element of the object optical system.

If condition (1) is satisfied, it becomes easy to attain coexistence of a compact nature and an aberration correction by a small number of lenses composed.

If it exceeds the upper limit of the condition (1), the power of a positive lens element becomes strong too much, and an aberration correction becomes to be hard.

On the other hand, if it is less than the lower limit of the condition (1), the power of a positive lens element becomes weak too much, and becomes difficult to keep the compact nature.

In the real image type variable magnification finder according to the present invention, it is more desirable that instead of the condition (1), the following condition (1-1) is satisfied:

$$1 < |fn/fp| < 1.6 \quad (1\text{-}1)$$

If the condition (1-1) is satisfied, it becomes easier to keep a balance of the compact nature and the aberration correction.

In addition, either one of the upper limit or the lower limit of the condition (1-1) to the condition (1) can be restricted.

Furthermore, to the condition (1), the lower limit can be set to 1.2 and the upper limit can be set to 1.4.

In the real image type variable magnification finder according to the present invention, it is desirable that the following condition (2) is satisfied:

$$0.15 < |fn/fe| < 0.9 \quad (2)$$

where fn represents a focal length of the negative lens element of the object optical system, and fe represents a composite focal length of the positive lens element and the prism of the eyepiece optical system.

If the condition (2) is satisfied, it becomes easy to keep a balance of the compact nature and the aberration correction.

If it exceeds the upper limit of the condition (2), the power of a negative lens element becomes weak too much.

On the other hand, if it is less than the lower limit of the condition (2), the power of a negative lens element becomes strong too much.

In these cases, a balance of movement of a negative lens element in a variable magnification action becomes worse, and keeping the compact nature becomes difficult.

In the real image type variable magnification finder according to the present invention, it is desirable that instead of the condition (2) the following condition (2-1) is satisfied:

$$0.2 < |fn/fe| < 0.8 \quad (2\text{-}1)$$

The condition (2-1) is a condition for making it easier to miniaturize.

In addition, to the condition (2), either of the upper limit or the lower limit of the condition (2-1) can be restricted.

Furthermore, to the condition (2), the lower limit can be set to 0.4 and the upper limit can be set to 0.6.

In the real image type variable magnification finder according to the present invention, it is desirable that the entrance surface of the prism is a convex surface directed toward the object side.

Thus, by such composition, a role of condensing lens can be given to an entrance surface of a prism, and it becomes advantageous to miniaturization of the whole finder.

In the real image type variable magnification finder according to the present invention, it is desirable to compose such that an exit surface of the prism of the eyepiece optical system is formed as a flat plane, the positive lens element of the eyepiece optical system is a biconvex lens element where the absolute value of radius of curvature of a surface at the object side is smaller than that of a surface at the pupil side, and a surface at the object side of the biconvex lens is aspherical.

By making an exit surface of the prism a flat plane, an influence owing to a change of a manufacturing cost and temperature or humidity can be suppressed. In this case, a burden of aberration correction of the positive lens element of an eyepiece optical system becomes large. However, if it is composed such that the positive lens element of the eyepiece optical system is a biconvex lens element where the absolute value of radius of curvature of a surface at the object side is smaller than that of a surface at the pupil side, and a surface at the object side of the biconvex lens element is aspherical, it becomes easy to suppress the aberration on the axis to off the axis.

In the real image type variable magnification finder according to the present invention, it is desirable that the following condition (3) is satisfied:

$$-0.1 < Dce/fe < 0.3 \tag{3}$$

where Dce represents a distance between the middle image and the entrance surface of the prism, and fe represents a composite focal length of the prism and the positive lens element of the eyepiece optical system.

If the condition (3) is satisfied, it becomes easy to miniaturize a real image type variable magnification finder.

If it is less than the lower limit of the condition (3), a peak on an entrance surface of a prism is located at an object side rather than a view frame, and composition becomes difficult.

On the other hand, if it exceeds the upper limit of the condition (3), the distance between a convex entrance surface of the prism and a middle image becomes depart, and accordingly miniaturization becomes difficult.

When a target is arranged in the entrance surface of the prism, it becomes impossible to neglect a diopter difference of the middle image and the target.

In the real image type variable magnification finder according to the present invention, it is desirable that instead of the condition (3), the following condition (3-1) is satisfied:

$$-0.05 < Dce/fe < 0.1 \tag{3-1}$$

The condition (3-1) is a condition for easier miniaturization.

In addition, to the condition (3), either of the upper limit or the lower limit of the condition (3-1) can be restricted.

Furthermore, to the condition (3), the lower limit can be set to −0.01 and the upper limit can be set to 0.05.

In the real image type variable magnification finder according to the present invention, it is desirable that the following condition (4) is satisfied:

$$-0.1 < Dps/fe < 0.3 \tag{4}$$

where Dps represents a distance on the optical axis where a distance between the exit surface of the positive lens element of the object optical system and the flare stop becomes minimum, and fe represents a composite focal length of the prism and a positive lens element of the eyepiece optical system.

If the condition (4) is satisfied, it becomes advantageous to flare reduction and miniaturization.

If it is less than the lower limit of the condition (4), the peak of the exit surface of the positive lens element is located at an image side rather than a flare stop, and composition becomes difficult. On the other hand, if it exceeds the upper limit of the condition (4), the flare stop and the component for an erect image becomes easily interfered, and it becomes difficult to achieve miniaturization.

In the real image type variable magnification finder according to the present invention, it is desirable that in stead of the condition (4) the following condition is satisfied:

$$-0.05 < Dps/fe < 0.1 \tag{4-1}$$

The condition (4-1) is a condition for easier miniaturization.

In addition, to the condition (4), either one of the upper limit or the lower limit of the condition (4-1) can be restricted.

Furthermore, to the condition (4), the lower limit can be set to −0.01 and the upper limit can be set to 0.05.

The imaging apparatus according to the present invention, comprises the real image type variable magnification finder according to one of the present inventions mentioned above and an imaging optical system for photographing a photographic object which is observed by the finder.

Since the real image type variable magnification finder according to the present invention is a low cost, it is suitable for a compact camera. According to the present invention, a real image type variable magnification finder which is low cost and little influenced by change of temperature or humidity besides, and an imaging apparatus equipped with the same can be obtained.

In particular, a real image type variable magnification finder suitable to what has a variable magnification ratio of a finder which is about 1.7 and an imaging apparatus using the same can be obtained.

THE FIRST EMBODIMENT

Figure 1:
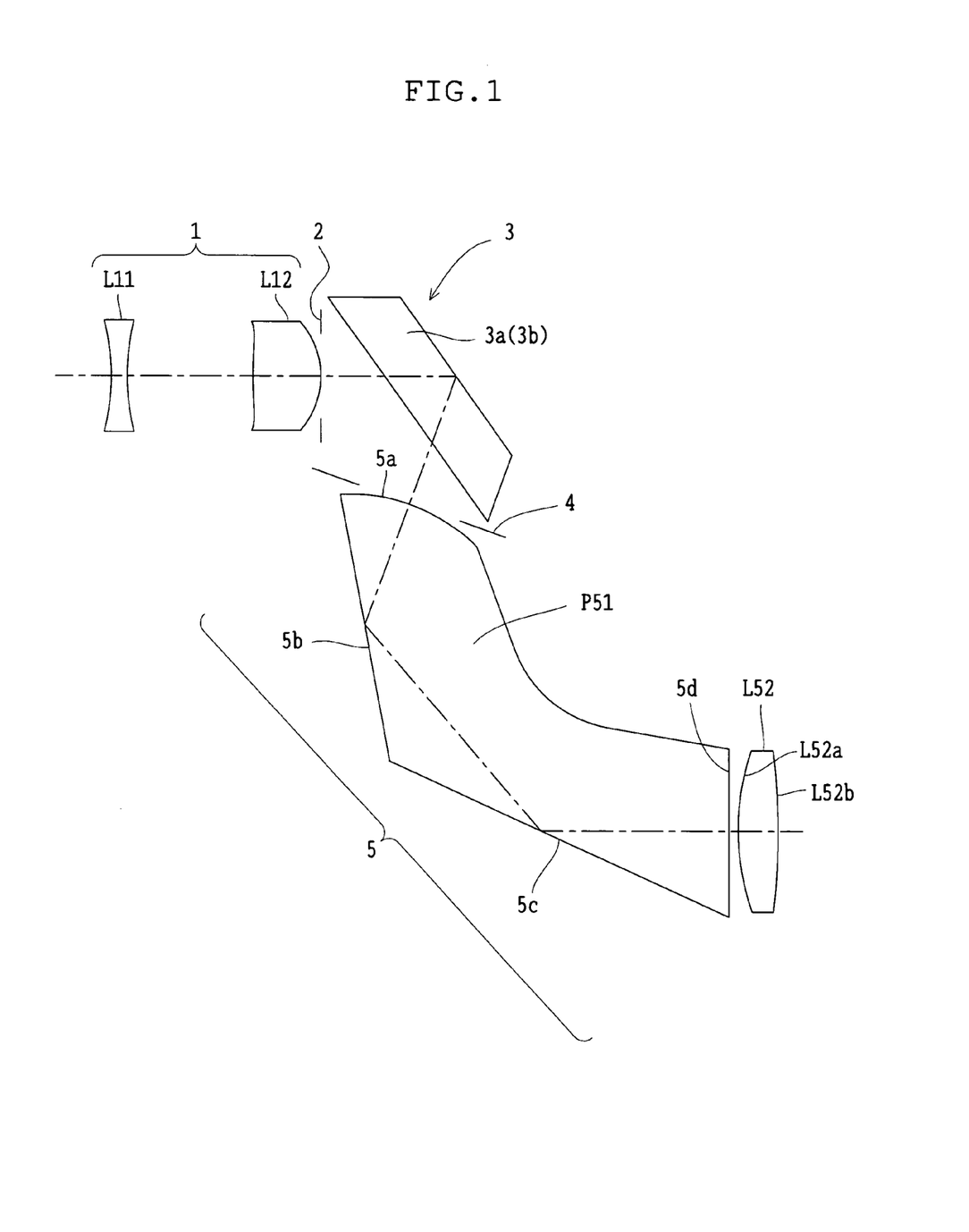
FIG. 1 is a sectional view showing an optical arrangement developed along the optical axis when focusing at infinite object point is performed at a wide angle end in a first embodiment of a real image type variable magnification finder according to the present invention.

FIG. 1 is a sectional view showing an optical arrangement developed along the optical axis when focusing an infinite object point is performed at a wide angle end in the first embodiment of a real image type variable magnification finder according to the present invention.

Figure 2A:
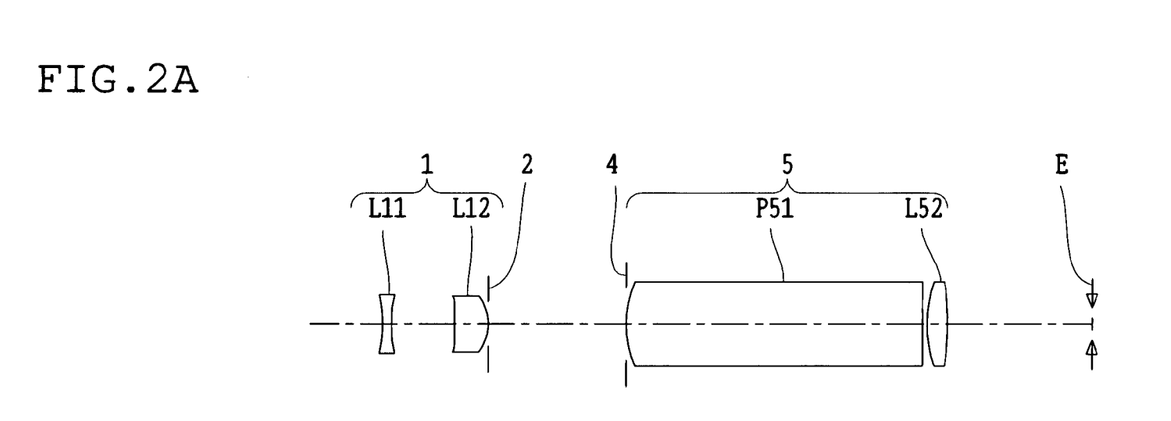
FIGS. 2A, 2B and 2C are sectional views showing optical arrangements developed along the optical axis, where optical arrangement of FIG. 1 has been converted on strait line, and states at a wide angle end, a middle focus distance position and a telephoto end, respectively.
Figure 2B:
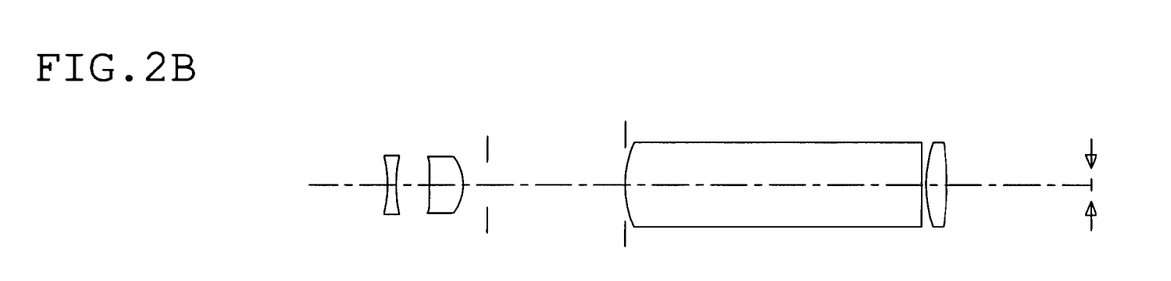
Figure 2C:
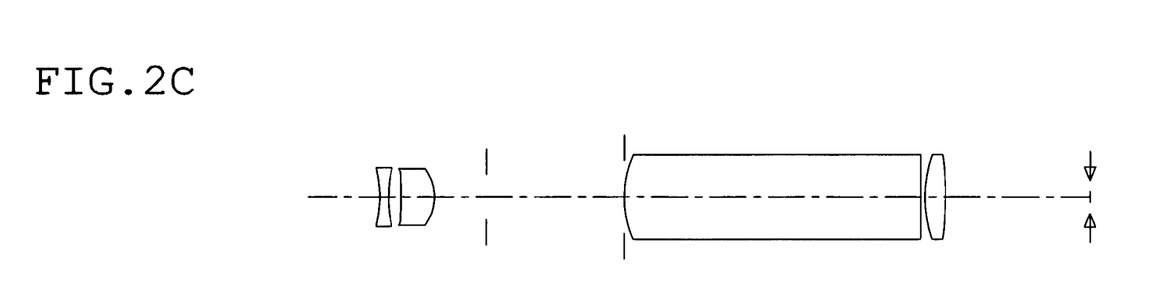
Figure 3A:
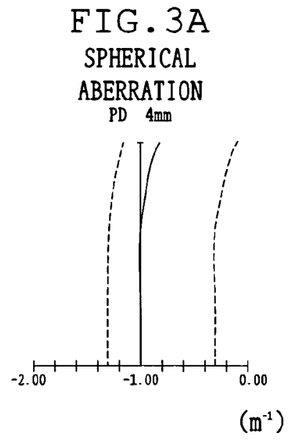
FIGS. 3A, 3B and 3C are diagrams showing states at a wide angle position.
Figure 3B:
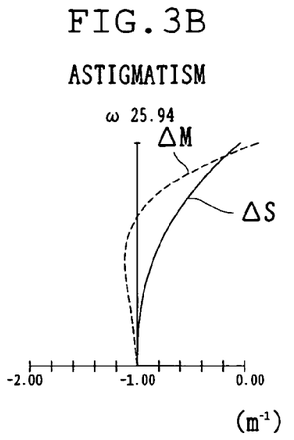
Figure 3C:
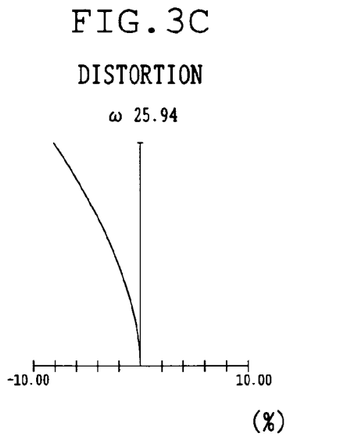
Figure 3D:
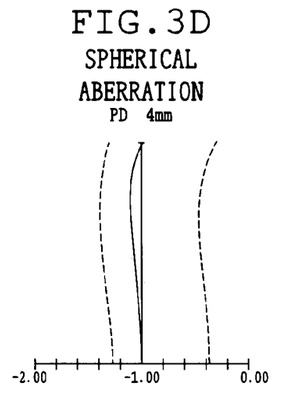
FIGS. 3D, 3E and 3F are diagrams showing states at a middle focus distance position, respectively.
Figure 3E:
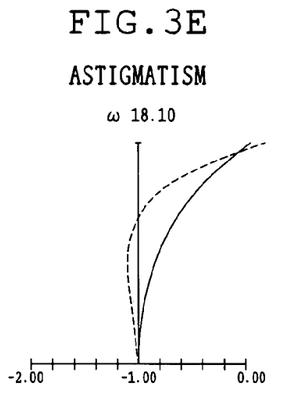
Figure 3F:
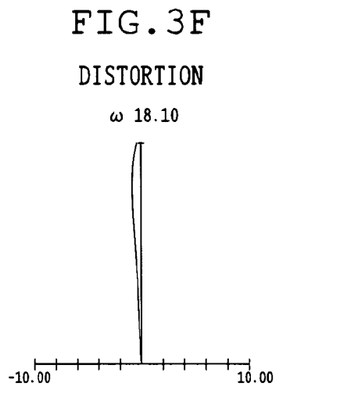
Figure 3G:
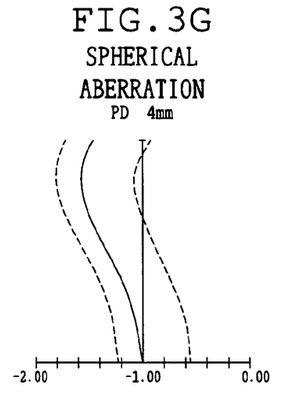
FIGS. 3G, 3H and 3I are diagrams showing states at a telephoto end, respectively.
Figure 3H:
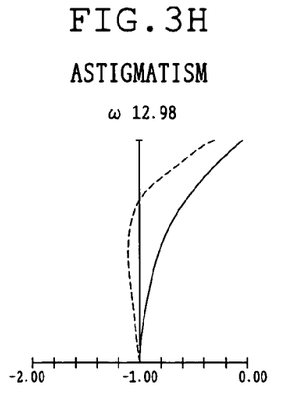
Figure 3I:
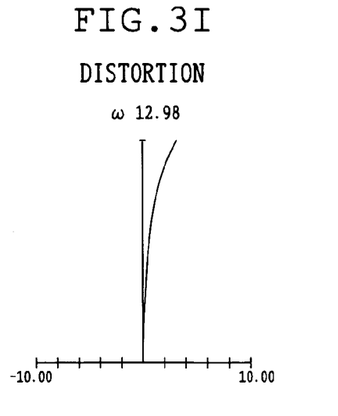

FIG. 2 shows sectional views showing optical arrangements developed along the optical axis, where the optical arrangement of FIG. 1 has been converted on a strait line. FIG. 2A shows a state at a wide angle end, FIG. 2B shows a state at a middle focus distance position and FIG. 2C shows a state at a telephoto end.

FIG. 3 shows diagrams showing spherical aberration, astigmatism and distortion, when an object point distance is 3 m, in the first embodiment of a real image type variable magnification finder according to the present invention. FIGS. 3A, 3B and 3C are diagrams showing states at a wide angle end. FIGS. 3D, 3E and 3F are diagrams showing states at a middle focus distance position, respectively. FIGS. 3G, 3H and 3I are diagrams showing states at a telephoto end, respectively.

The real image type variable magnification finder optical system of the first embodiment is composed to have an object optical system 1, a flare stop 2, a Dach mirror (roof mirror) 3, a view frame 4 and an eyepiece optical system 5.

The object optical system 1 has in order from an object side, a biconcave lens element L11 which is a single lens, and a biconvex lens L12 which is a single lens, and it is composed so that it has positive refracting power as a whole, and an objective image is formed as a middle image.

The Dach mirror 3 has the first mirror surface 3a and the second mirror surface 3b. (in FIG. 1, mirror surfaces are shown in overlapped state)

The view frame 4 is arranged near the middle image position. The eyepiece optical system 5 has the prism P51 which has an entrance surface 5a near the middle image position and a biconvex lens L52 which is a single lens, and it is composed such that it has positive refracting power as a whole, and a pupil E for observing a middle image is formed.

The prism P51 has the entrance surface 5a, the first refracting surface 5b, the second refracting surface 5c and an exit surface 5d.

A convex surface of the entrance surface 5a of the prism P51 is directed toward the object side. The exit surface 5d of the prism P51 is formed to be plane shape.

The absolute value of radius of curvature of a surface L52a which is directed toward the object side of the biconvex lens L52 is smaller than that of a surface L52b which is at a pupil side. The surface L52a which is at the object side, of the biconvex lens L52 is formed aspherical.

Two mirror surfaces 3a and 3b of Dach mirror 3, and two refracting surfaces 5b and 5c of the prism P51 are arranged to be divided before and after a middle image position. These refracting surfaces compose an erect image optical surface, and have an action for making an erect image by bending an optical path in the middle of the optical path of a finder.

When a variable magnification changes from a wide angle end to a telephoto end, the biconcave lens L11 moves toward the object side once after having moved toward the pupil side slightly, and the biconvex lens L12 moves toward the object side. As for the flare stop 2, its position remains fixed irrespective of any magnification state of the object optical system 1.

Numerical Data

Lens data of optical components constituting a real image type variable magnification finder of the first embodiment are shown below.

In the numerical data of the first embodiment, ω expresses a half angle of view, and D1 and D2 express a variable interval.

Also, when z is taken as the coordinate in the direction of the optical axis, y is taken as the coordinate normal to the optical axis, K represents a conic constant, and $A_4$, $A_6$, $A_8$, and $A_{10}$ represent aspherical coefficients, the configuration of each of the aspherical surface is expressed by the following equation:

$$z = (y^2/r)/\left[1 + \{1 - (1+K)(y/r)^2\}^{1/2}\right] +$$

$$A_4 y^4 + A_6 y^6 + A_8 y^8 + A_{10} y^{10}$$

Numerical Data 1

Half angle of view ω: 25.9–18.1–13.0 (°)

Finder magnification: 0.39–0.54–0.73

Pupil size (pupil diameter; PD): 4 mm

| Surface number | Radius of curvature | Surface Interval | Index of refraction | Abbe's number |
|---|---|---|---|---|
| 1 | −13.4984 | 0.80 | 1.58423 | 30.49 |
| 2* | 12.8856 | D1 | | |
| 3* | 19.3414 | 3.47 | 1.49236 | 57.86 |
| 4* | −5.0133 | D2 | | |
| 5 | ∞ | 14.375 | | |
| 6 | ∞ | 0.00 | | |
| 7 | 9.3858 | 31.00 | 1.52542 | 55.78 |
| 8 | ∞ | 0.50 | | |
| 9* | 13.5064 | 2.10 | 1.49236 | 57.86 |
| 10 | −48.4441 | 15.00 | | |
| | EP | | | | the fifth surface: a flare cut stop the sixth surface: a middle image forming surface and a view frame EP: eye point (exit pupil)

Aspherical Surface Coefficient

| Surface number | K | $A_4$ | $A_6$ | $A_8$ | $A_{10}$ |
|---|---|---|---|---|---|
| 3 | 0 | −2.6437E−03 | −8.3639E−05 | −9.7824E−06 | 6.7879E−08 |
| 4 | 0 | −2.6296E−04 | −6.2017E−05 | −3.6509E−06 | 2.6220E−07 |
| 9 | 0 | −1.0735E−04 | 1.1374E−06 | −3.5545E−08 | 0 |

In the table, E−i means ×10$^{-i}$, for example, −2.6437E−03 stands for −2.6437 × 10$^{-3}$ Variable Distance

| | Wide angle end | Middle position | Telephoto end |
|---|---|---|---|
| D1 | 6.616 | 3.524 | 1.295 |
| D2 | 0 | 2.404 | 5.647 |

Parameters in the Conditions:

Object optical system: Focal length of the negative lens: fn=−11.16 mm

Object optical system: Focal length of the positive lens: fp=8.49 mm

Eyepiece lens: Composite focal length of the prism and the positive lens: fe=21.02 mm Distance between a convex entrance surface of the prism and the middle image: Dce=0.00 mm Minimum distance from a peak of the exit surface of the positive lens of the object optical system to the flare cut stop:

Dps=0.00 mm
|fn/fp|=|−11.16/8.49|=1.31
|fn/fe|=|−11.16/21.02|=0.53
Dce/fe=0.00/21.02=0.00
Dps/fe=0.00/21.02=0.00

In the real image type variable magnification finder according to the present invention, a way for bending an optical path by a refracting surface can be such composition that an optical axis is bent in three dimensions. For example, by using a one time reflecting mirror and a three times reflecting prism an arrangement of Porro mirror and a Porro prism can be adopted, or by using a two time reflecting mirror and a three times reflecting prism other arrangement can be adopted.

Figure 4:
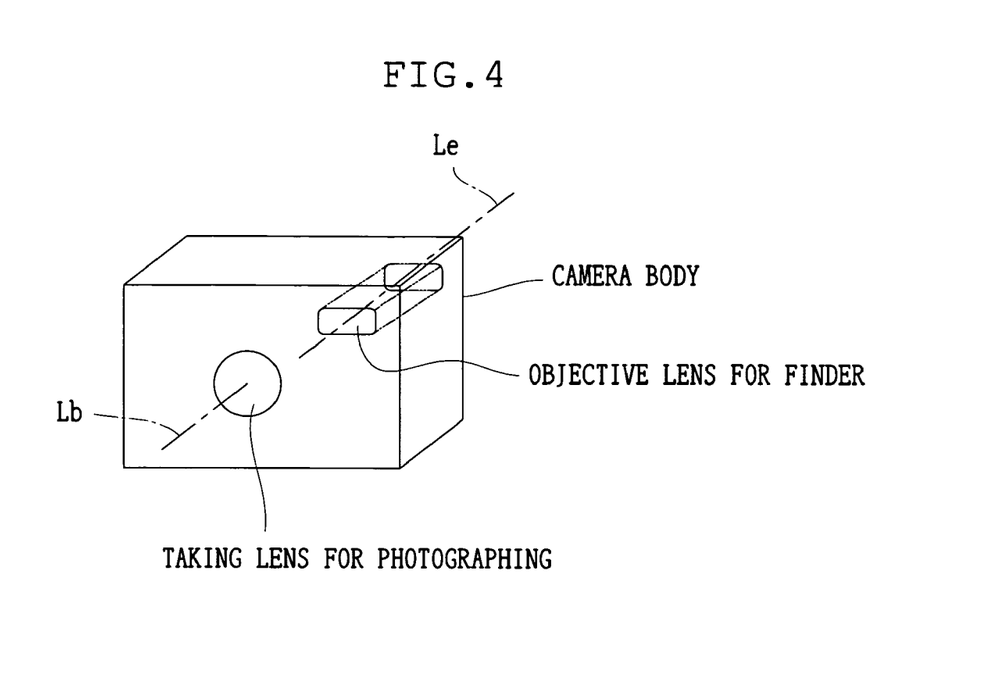
FIG. 4 is a perspective view showing an outlined construction of a digital camera as an example of an imaging apparatus using the real image type variable magnification finder according to the present invention.
Figure 5:
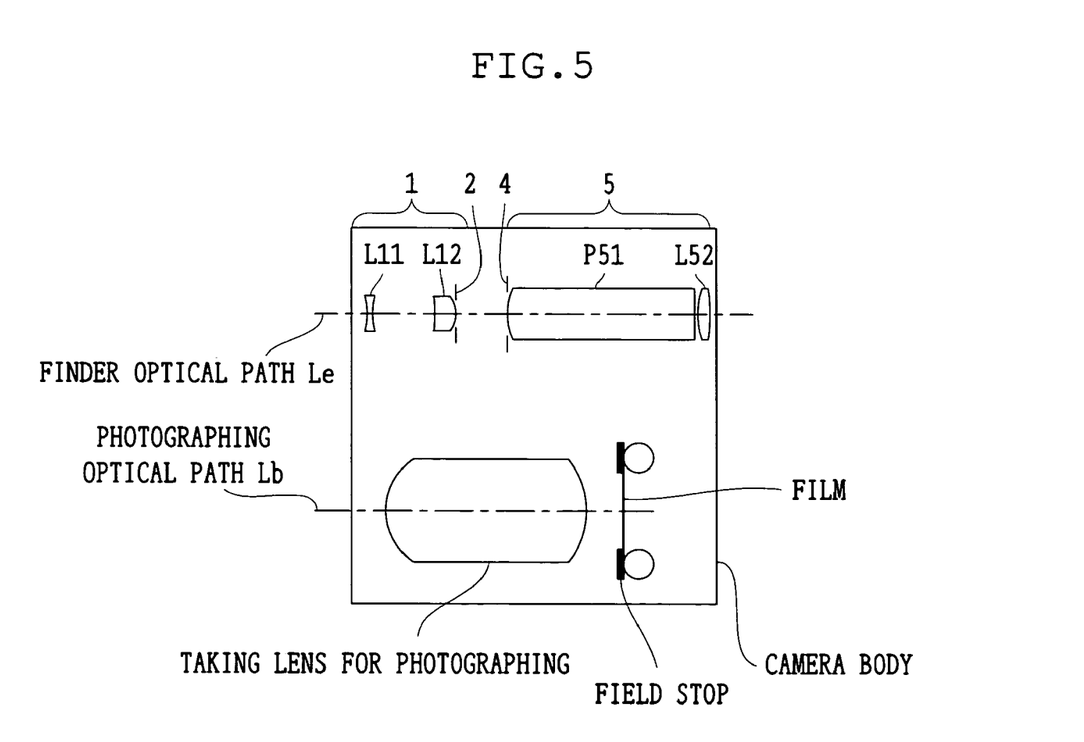
FIG. 5 is a sectional view of the compact camera of FIG. 4.

The real image type variable magnification finder according to the present invention can be used as a photographing finder of a compact camera having a composition as shown as a perspective view in FIG. 4 and a sectional view in FIG. 5, respectively. In FIG. 4, Lb shows an optical path for photographing, and Le shows the optical path for a finder. For convenience of illustration, FIG. 5 shows a state that the optical path of a finder optical system is not bent according to FIG. 2. Here, a composition of an objective lens for photographing has been omitted. As shown in FIG. 5, an image of a photographing object is observed by a finder which is composed of an objective lens 1 for finder having the composition, for example, of the first embodiment according to the present invention, a flare stop 2, a Dach mirror (illustration is omitted as in FIG. 2), a view frame 4 and a finder composed of an eyepiece optical system 5, and is formed on film by a taking lens.

While the invention has been described in its preferred embodiments, it is to be understood that the present invention is not limited to the specific embodiments and various modifications can be made in the invention without departing from the spirit and scope of the invention. For example, although an image of a photographing subject is formed on a film in the embodiments mentioned above, it may be formed not only on the film but also on an image pickup device, such as CCD and the like in the present invention.

What is claimed is:

1. A real image type variable magnification finder comprising,
   an object optical system having positive refracting power which forms an objective image as a middle image,
   a view frame arranged near a position of the middle image, and
   an eyepiece optical system having positive refracting power which forms a pupil for observing the middle image,
   wherein a plurality of image erecting optical surfaces for making an erect image by bending an optical path are formed on the way of optical paths of the object optical system and the eyepiece optical system,
   wherein the object optical system comprises, in order from an object side, a negative lens component which is a single lens and a positive lens component which is a single lens, both of the negative lens component and the positive lens component being moved in a magnification change while changing a distance therebetween,
   wherein the eyepiece optical system comprises a prism having an entrance surface that is a convex surface directed toward the object side and arranged on a pupil side of the middle image, and a positive lens component which is a single lens,
   wherein the view frame is arranged on the object side of the entrance surface of the prism,
   wherein the image erecting optical surfaces are formed to be divided before and after the position of the middle image,
   wherein, in an entire system of the real image type variable magnification finder, a total number of lens components and prisms each having refracting power is four, the lens components and prisms each having refracting power being composed of plastic, and
   wherein the following condition is satisfied:

$0.8 < |fn/fp| < 1.8$ where fn represents a focal length of the negative lens component of the object optical system, and fp represents a focal length of the positive lens component of the object optical system.

2. The real image type variable magnification finder according to claim 1, further comprising a flare stop, which remains fixed, irrespective of a magnification state of the object optical system, near a position of a pupil-side surface top of the positive lens component of the object optical system in a state where the positive lens component of the object optical system is at a nearest position to the middle image.

3. The real image type variable magnification finder according to claim 1, wherein the following condition is satisfied:

$1 < |fn/fe| < 1.6.$

4. The real image type variable magnification finder according to claim 1, wherein the following condition is satisfied:

$0.15 < |fn/fe| < 0.9$ where fn represents a focal length of the negative lens component of the object optical system, and fe represents a composite focal length of the prism and the positive lens component of the eyepiece optical system.

5. The real image type variable magnification finder according to claim 4, wherein the following condition is satisfied:

$0.2 < |fn/fe| < 0.8.$

6. The real image type variable magnification finder according to claim 1, wherein an exit surface of the prism of the eyepiece optical system is formed as a plane surface, the positive lens component of the eyepiece optical system is a biconvex lens element with an absolute Value of a radius of curvature of an object-side surface thereof being smaller than that of a pupil-side surface thereof, and the object-side surface of the biconvex lens element is aspherical.

7. The real image type variable magnification finder according to claim 1, wherein the following condition is satisfied:

$-0.1 < Dce/fe < 0.3$ where Dce represents a distance between the middle image and the entrance surface of the prism, and fe represents a composite focal length of the prism and the positive lens component of the eyepiece optical system.

8. The real image type variable magnification finder according to claim 7, wherein the following condition is satisfied:

$-0.05 < Dce/fe < 0.1.$

9. The real image type variable magnification finder according to claim 2, wherein the following condition is satisfied:

$$-0.1 < Dps/fe < 0.3$$

where Dps represents a minimum distance, along an optical axis, between an exit surface of the positive lens component of the object optical system and the flare stop, and fe represents a composite focal length of the prism and the positive lens component of the eyepiece optical system.

10. The real image type variable magnification finder according to claim 9, wherein the following condition is satisfied:

$$-0.05 < Dps/fe < 0.1.$$

11. An imaging apparatus comprising the real image type variable magnification finder according to claim 1 and a photographing optical system for photographing an object which is observed via the finder.

12. A real image type variable magnification finder comprising,
an object optical system having positive refracting power which forms an objective image as a middle image,
a view frame arranged near a position of the middle image, and
an eyepiece optical system having positive refracting power which forms a pupil for observing the middle image,
wherein a plurality of image erecting optical surfaces for making an erect image by bending an optical path are formed on the way of optical paths of the object optical system and the eyepiece optical system,
wherein the object optical system comprises, in order from an object side, a negative lens component which is a single lens and a positive lens component which is a single lens, both of the negative lens component and the positive lens component being moved in a magnification change while changing a distance therebeteween,
wherein the eyepiece optical system comprises a prism having an entrance surface that is arranged near the position of the middle image, and a positive lens component which is a single lens,
wherein the image erecting optical surfaces are formed to be divided before and after the position of the middle image,
wherein, in an entire system of the real image type variable magnification finder, a total number of lens components and prisms each having refracting power is four, the lens components and prisms each having refracting power being composed of plastic, and
wherein the following condition is satisfied:

$$0.15 < |fn/fe| < 0.9$$

where fn represents a focal length of the negative lens component of the object optical system, and fe represents a composite focal length of the prism and the positive lens component of the eyepiece optical system.

13. The real image type variable magnification finder according to claim 12, wherein the following condition is satisfied:

$$0.2 < |fn/fe| < 0.8.$$

14. A real image type variable magnification finder comprising,
an object optical system having positive refracting power which forms an objective image as a middle image,
a view frame arranged near a position of the middle image, and
an eyepiece optical system having positive refracting power which forms a pupil for observing the middle image,
wherein a plurality of image erecting optical surfaces for making an erect image by bending an optical path are formed on the way of optical paths of the object optical system and the eyepiece optical system,
wherein the object optical system comprises, in order from an object side, a negative lens component which is a single lens and a positive lens component which is a single lens, both of the negative lens component and the positive lens component being moved in a magnification change while changing a distance therebeteween,
wherein the eyepiece optical system comprises a prism having an entrance surface that is a convex surface directed toward the object side and arranged near the position of the middle image, and a positive lens component which is a single lens,
wherein the image erecting optical surfaces are formed to be divided before and after the position of the middle image,
wherein, in an en tire system of the real image type variable magnification finder, a total number of lens components and prisms each having refracting power is four, the lens components and prisms each having refracting power being composed of plastic, and
wherein the following condition is satisfied:

$$-0.1 < Dce/fe < 0.3$$

where Dce represents a distance between the middle image and the entrance surface of the prism, and fe represents a composite focal length of the prism and the positive lens component of the eyepiece optical system.

15. The real image type variable magnification finder according to claim 14, wherein the following condition is satisfied:

$$-0.05 < Dce/fe < 0.1.$$

16. A real image type variable magnification finder comprising,
an object optical system having positive refracting power which forms an objective image as a middle image,
a view frame arranged near a position of the middle image, and
an eyepiece optical system having positive refracting power which forms a pupil for observing the middle image,
wherein a plurality of image erecting optical surfaces for making an erect image by bending an optical path are formed on the way of optical paths of the object optical system and the eyepiece optical system,
wherein the object optical system comprises, in order from an object side, a negative lens component which is a single lens and a positive lens component which is a single lens, both of the negative lens component and the positive lens component being moved in a magnification change while changing a distance therebeteween,
wherein the eyepiece optical system comprises a prism having an entrance surface that is arranged near the position of the middle image, and a positive lens component which is a single lens, wherein the image erecting optical surfaces are formed to be divided before and after the position of the middle image, wherein, in an entire system of the real image type variable magnification finder, a total number of lens components and prisms each having refracting power is four, the lens components and prisms each having refracting power being composed of plastic, wherein the real image type variable magnification finder further comprises a flare stop, which remains fixed, irrespective of a magnification state of the object optical system, arranged near a position of a pupil-side surface top of the positive lens component of the object optical system in a state where the positive lens component of the object optical system is at a nearest position to the middle image, and wherein the following condition is satisfied:

−0.1<Dps/fe<0.3 where Dps represents a minimum distance, along an optical axis, between an exit surface of the positive lens component of the object optical system and the flare stop, and fe represents a composite focal length of the prism and the positive lens component of the eyepiece optical system.

17. The real image type variable magnification finder according to claim 16, wherein the following condition is satisfied:

−0.05<Dps/fe<0.1.

18. An imaging apparatus comprising the real image type variable magnification finder according to any one of claims 12, 14 and 16, and a photographing optical system for photographing an object which is observed via the finder.

19. A real image type variable magnification finder comprising, an object optical system having positive refracting power which forms an objective image as a middle image, a view frame arranged near a position of the middle image, and an eyepiece optical system having positive refracting power which forms a pupil for observing the middle image, wherein a plurality of image erecting optical surfaces for making an erect image by bending an optical path are formed on the way of optical paths of the object optical system and the eyepiece optical system, wherein the object optical system comprises, in order from an object side, a negative lens component which is a single lens and a positive lens component which is a single lens, both of the negative lens component and the positive lens component being moved in a magnification change while changing a distance therebeteween, wherein the eyepiece optical system comprises a prism having an entrance surface that is a convex surface directed toward the object side and arranged on a pupil side of the middle image, and a positive lens component which is a single lens, wherein the view frame is arranged on the object side of the entrance surface of the prism, wherein the image erecting optical surfaces are formed to be divided before and after the position of the middle image, wherein, in an en tire system of the real image type variable magnification finder, a total number of lens components and prisms each having is four, the lens components and prisms each having refracting power being composed of plastic, and wherein the following condition is satisfied:

0.15<|fn/fe|<0.9 where fn represents a focal length of the negative lens component of the object optical system, and fe represents a composite focal length of the prism and the positive lens component of the eyepiece optical system.

20. The real image type variable magnification finder according to claim 19, wherein the following condition is satisfied:

0.2<|fn/fe|<0.8.

21. A real image type variable magnification finder comprising, an object optical system having positive refracting power which forms an objective image as a middle image, a view frame arranged near a position of the middle image, and an eyepiece optical system having positive refracting power which forms a pupil for observing the middle image, wherein a plurality of image erecting optical surfaces for making an erect image by bending an optical path are formed on the way of optical paths of the object optical system and the eyepiece optical system, wherein the object optical system comprises, in order from an object side, a negative lens component which is a single lens and a positive lens component which is a single lens, both of the negative lens component and the positive lens component being moved in a magnification change while changing a distance therebeteween, wherein the, eyepiece optical system comprises a prism having an entrance surface that is a convex surface directed toward the object side and arranged on a pupil side of the middle image, and a positive lens component which is a single lens, wherein the view frame is arranged on the object side of the entrance surface of the prism, wherein the image erecting optical surfaces are formed to be divided before and after the position of the middle image, wherein, in an entire system of the real image type variable magnification finder, a total number of lens components and prisms each having is four, the lens components and prisms each having refracting power being composed of plastic, and wherein the following condition is satisfied:

−0.1<Dce/fe<0.3 where Dce represents a distance between the middle image and the entrance surface of the prism, and fe represents a composite focal length of the prism and the positive lens component of the eyepiece optical system.

22. The real image type variable magnification finder according to claim 21, wherein the following condition is satisfied:

−0.05<Dce/fe<0.1.

23. A real image type variable magnification finder comprising, an object optical system having positive refracting power which forms an objective image as a middle image, a view frame arranged near a position of the middle image, and an eyepiece optical system having positive refracting power which forms a pupil for observing the middle image, wherein a plurality of image erecting optical surfaces for making an erect image by bending an optical path are formed on the way of optical paths of the object optical system and the eyepiece optical system, wherein the object optical system comprises, in order from an object side, a negative lens component which is a single lens and a positive lens component which is a single lens, both of the negative lens component and the positive lens component being moved in a magnification change while changing a distance therebeteween, wherein the eyepiece optical system comprises a prism having an entrance surface that is a convex surface directed toward the object side and arranged on a pupil side of the middle image, and a positive lens component which is a single lens, wherein the view frame is arranged on the object side of the entrance surface of the prism, wherein the image erecting optical surfaces are formed to be divided before and after the position of the middle image, wherein, in an entire system of the real image type variable magnification finder, a total number of lens components and prisms each having is four, the lens components and prisms each having refracting power being composed of plastic, wherein the real image type variable magnification finder further comprises a flare stop, which remains fixed, irrespective of a magnification state of the object optical system, near a position of a pupil-side surface top of the positive lens component of the object optical system in a state where the positive lens component of the object optical system is at a nearest position to the middle image, and wherein the following condition is satisfied:

$$-0.1 < Dps/fe < 0.3$$

where Dps represents a minimum distance, along an optical axis, between an exit surface of the positive lens component of the object optical system and the flare stop, and fe represents a composite focal length of the prism and the positive lens component of the eyepiece optical system.

24. The real image type variable magnification finder according to claim 23, wherein the following condition is satisfied:

$$-0.05 < Dps/fe < 0.1.$$

25. An imaging apparatus comprising the real image type variable magnification finder according to any one of claims 19, 21 and 23, and a photographing optical system for photographing an object which is observed via the finder.

* * * * *